United States Patent [19]

Ata

[11] Patent Number: 5,027,338
[45] Date of Patent: Jun. 25, 1991

[54] TRACKING DEFECT PREVENTING CIRCUIT

[75] Inventor: Kazuhisa Ata, Kanagawa, Japan

[73] Assignee: Kyocera Corporation, Kyoto, Japan

[21] Appl. No.: 288,416

[22] Filed: Dec. 21, 1988

[30] Foreign Application Priority Data

Dec. 25, 1987 [JP] Japan .................. 62-330408

[51] Int. Cl.$^5$ .............................................. G11B 7/00
[52] U.S. Cl. ....................... 369/44.29; 369/44.32; 369/44.35
[58] Field of Search ................. 369/44, 45, 46, 54, 369/58, 109, 44.25–44.41, 124; 235/454, 476; 318/577; 250/202

[56] References Cited

U.S. PATENT DOCUMENTS 4,821,251  4/1989  Hosoya .................. 369/44

FOREIGN PATENT DOCUMENTS 0041446  3/1983  Japan .

Primary Examiner—Roy N. Envall, Jr.
Assistant Examiner—Thang V. Tran
Attorney, Agent, or Firm—Spensley Horn Jubas & Lubitz

[57] ABSTRACT

Tracking servo control of a pickup to an optical card is performed by: obtaining an addition of two tracking error signals detected through respective sub-beam spots, detecting that at least one of the sub-beam spots has met a scratch, etc. from the addition signal, and suspending the tracking servo control while the sub-beam spot is in contact with or located on the scratch, etc. by interrupting a difference error signal and holding a value of the difference error signal just before the interruption.

8 Claims, 2 Drawing Sheets

TRACKING DEFECT PREVENTING CIRCUIT

BACKGROUND OF THE INVENTION

The present invention relates to a tracking defect preventing circuit in a recording/reproducing apparatus using an optical recording medium, which prevents such a failure in tracking servo control as is caused by a scratch, stain or dust on a recording surface of the recording medium. More specifically, an embodiment of the invention is adapted for a reader/writer of an "optical card".

In a recording/reproducing apparatus of the optical card, for example, focusing control and tracking control of a laser beam which illuminates a recording surface of the optical card are performed as shown in FIG. 1. The focusing and tracking control shown in FIG. 1 is called a "three beams method", where a main beam spot MS is used for the focusing control and sub-beam spots $SS_1$ and $SS_2$ are used for the tracking control. Using these sub-beam spots $SS_1$ and $SS_2$, corresponding tracking error signals E and F are produced. FIG. 1 assumes the case where some foreign substance FS such as a scratch, stain, etc. are placed on the recording surface of the card C in such a manner that the foreign substance FS spans both of at least one of guide tracks GT (dark area) and an information-recording area L (light area). Even in the case where the card C is moved in a direction indicated by an arrow with the two sub-beam spots $SS_1$ and $SS_2$ being located on the two guide tracks GT with the same condition (e.g., both spots making just landing on the respective guide tracks), only the front spot $SS_1$ firstly contacts with the substance FS, causing abrupt occurrence of the imbalance between the tracking error signals E and F. According to this imbalance in the tracking error signals, a difference error signal which is produced by an error signal amplifier is suddenly increased to a large value, and therefore an optical pickup, which is driven by an actuator, is removed away from the track to be traced.

In a CD (Compact Disk) player, the above-described problem is solved by delaying the tracking error signal corresponding to the front sub-beam spot. However, this method is not applicable to the optical card because of the following two reasons. While in the CD player linear moving velocity of a disk is about 1.2 m/sec, in the optical card moving velocity of the card is extremely low, that is, 68.3 mm/sec at a writing (recording) operation and 410 mm/sec at a reading (reproducing) operation. As a result, if the above delaying method is applied to the optical card, a frequency range of the delaying operation becomes located within that of tracking servo and hence the tracking control cannot be performed. The other reason is that a linear shuttle movement is employed in the optical card.

SUMMARY OF THE INVENTION

An object of the present invention is to overcome the above-described problem. Stated more specifically, an object of the invention is to prevent an optical pickup from being moved away from the track to be traced even in the case of detecting a scratch etc. on a recording surface of an optical card.

A tracking defect preventing circuit according to an embodiment of the present invention performs tracking servo control by: obtaining an addition of tracking error signals detected through the respective sub-beam spots; detecting that at least one of the sub-beam spots has met a scratch, etc. from the addition error signal; and suspending the servo control in a period in which the sub-beam spot is in contact with or located on the scratch, etc. by interrupting a difference error signal and holding a value of the difference error signal just before the interruption.

Other and further objects, features and advantages of the invention will appear more fully from the following description taken in connection with the accompanying drawings.

DETAILED DESCRIPTION OF THE PREFERRED EMBODIMENT

A preferred embodiment of the present invention will be described with reference to the drawings.

Figure 1:
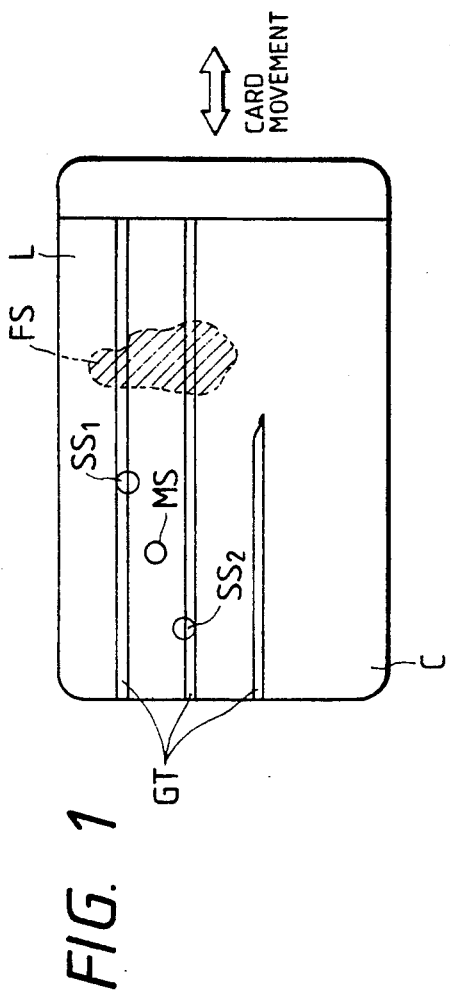
FIG. 1 is a schematic drawing illustrating an influence of a foreign substance on tracking control.
Figure 2:
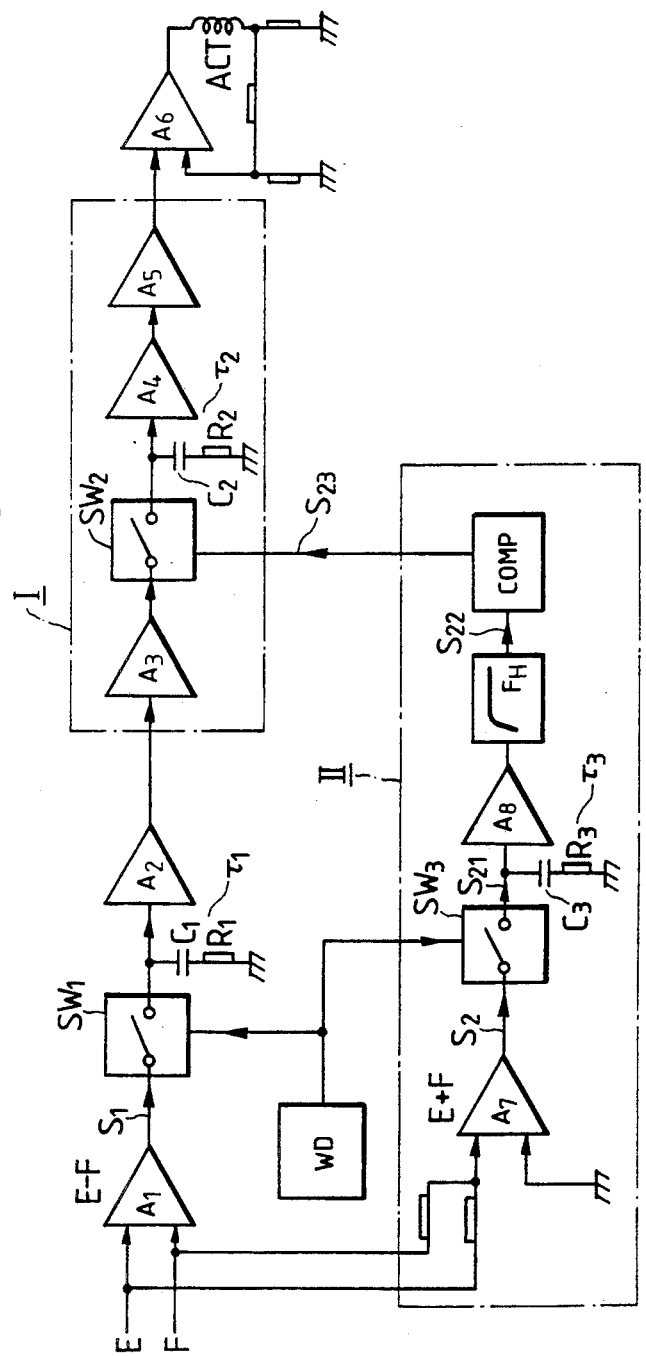
FIG. 2 is a circuit diagram, partly a block diagram, of a tracking defect preventing circuit according to an embodiment of the present invention.

FIG. 2 is a circuit diagram of a tracking defect preventing circuit according to an embodiment of the invention. In this drawing, reference characters E and F denote tracking error signals which correspond to sub-beam spots $SS_1$ and $SS_2$ shown in FIG. 1. An error signal amplifier $A_1$ amplifies a difference (E-F) between E and F and outputs a difference error signal $S_1$. The signal $S_1$ is sent to a tracking phase compensation section I through a first switch $SW_1$ and buffer amplifier $A_2$. Between the switch $SW_1$ and the buffer amplifier $A_2$ is provided a series connection of a condenser $C_1$ and a resister $R_1$ forming a time constant $\tau_1$ which is sufficiently small. An output signal of the tracking phase compensation section I is sent through a driver amplifier $A_6$ to an actuator ACT as a control signal. The actuator ACT moves an optical pickup.

In the tracking phase compensation section I, an amplifier $A_3$ amplifies an inputted error signal (difference signal). An output signal of the amplifier $A_3$ is sent through a second switch $SW_2$ to a buffer amplifier $A_4$. Between the switch $SW_2$ and the buffer amplifier $A_4$ is provided a series connection of a condenser $C_2$ and a resistor $R_2$ forming a time constant $\tau_2$ which is sufficiently larger than $\tau_1$. The difference error signal is finally outputted from an amplifier $A_5$.

On the other hand, in a tracking defect responding section II, an addition amplifier $A_7$ amplifies an addition (E+F) of the tracking error signals E and F to produce an addition error signal $S_2$. The signal $S_2$ is sent through a third switch $SW_3$ and a buffer amplifier $A_8$ to a high-pass filter $F_H$. Between the switch $SW_3$ and the buffer amplifier $A_8$ is provided a series connection of a condenser $C_3$ and a resistor $R_3$ forming a time constant $\tau_3$ which is sufficiently small and about the same as $\tau_1$. An output $S_{22}$ of the high-pass filter $F_H$ is sent to a window comparator COMP.

The operation of the circuit of FIG. 2 will be hereinafter described. Firstly, description will be made for an operation to prevent a tracking defect which may occur in writing information.

Since the laser beam power is increased in writing information, the difference error signal and the addition error signal become likely to have undesirably large values. In order to prevent the tracking defect caused by these large values of the error signals, the switches $SW_1$ and $SW_3$ are equipped in the circuit of FIG. 2.

Figure 3A:
FIG. 3A to FIG. 3D are signal waveforms in a writing operation of the tracking defect preventing circuit of FIG. 2.
Figure 3B:

FIG. 3A shows a write pulse signal. Corresponding to this write pulse signal, there appear large pulses in the addition error signal $S_2$ as shown in FIG. 3B. (In the reading operation $S_2$ takes flat and small values.)

Figure 3C:
Figure 3D:

As shown in FIG. 3C, in the writing operation, a write delaying signal is provided from a circuit WD to the switches $SW_1$ and $SW_3$. In response to the write delaying signal the difference error signal $S_1$ is interrupted by the switch $SW_1$, and an output voltage of $SW_1$ just before the interruption is held by means of the time constant $\tau_1$. Moreover, in response to the write delaying signal the addition error signal $S_2$ is interrupted by the switch $SW_3$, and an output voltage of $SW_3$ just before the interruption is held by means of the time constant $\tau_3$, so that the output signal $S_{21}$ from the switch $SW_3$ has a relatively flat waveform of low level as shown in FIG. 3D. As shown in FIG. 3C, pulse width of the write delaying signal is elongated by an amount of $T_D$ so that a tail portion TL of the addition error signal $S_2$ may not appear at the output of the switch $SW_3$.

Next, description will be made for an operation to prevent a tracking defect which may occur when the sub-beam spots encounter a scratch, etc.

Figure 4A:
FIG. 4A to FIG. 4C are signal waveforms for explaining an operation to prevent a tracking defect caused by the foreign substance.
Figure 4B:
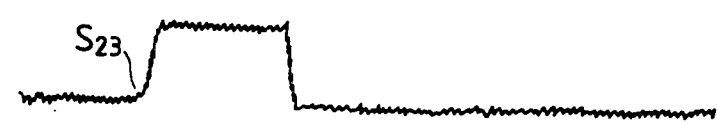
Figure 4C:
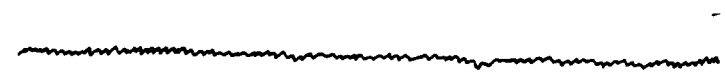

When at least one of the sub-beam spots becomes in contact with a scratch, etc., a high level pulse appears at the output of the switch $SW_3$ and a waveform of this high level pulse, after DC component elimination by the high pass filter $F_H$, is as shown in FIG. 4A where a reference symbol $S_D$ denotes this high level pulse portion. If this high level portion $S_D$ exceeds a threshold value, judging that the high level portion corresponds to the scratch, etc., the window comparator COMP provides a rectangular-wave signal $S_{23}$ as shown in FIG. 4B to the switch $SW_2$ in the tracking phase compensation section I to open it. Mainly due to a phase-advancing feature of high-pass filter $F_H$, the difference error signal has not yet reached the switch $SW_2$ at this moment. By opening the switch $SW_2$, the servo system is temporarily suspended and an output voltage just before the opening of $SW_2$ is held by means of the time constant $\tau_2$. As a result, the actuator ACT is prevented from being driven on the basis of the difference error signal which has, due to the scratch, etc., an abnormally large value.

In this case, even if the main beam spot MS becomes in contact with the scratch, etc. on an optical card surface, the tracking servo system normally operates as long as the two sub-beam spots $SS_1$ and $SS_2$ are correctly detecting respective guide tracks GT.

As described in the foregoing, while the signal $S_{23}$ is temporarily in the high level "H", the switch $SW_2$ is kept opened and the abnormally large difference error signal is prevented from passing through the switch $SW_2$. Since the signal $S_{23}$ is a digital signal, when it returns to the low level "L", the switch $SW_2$ is closed and the servo system starts to operate. This means that when the sub-beam spot leaves the scratch, etc. the servo system starts to operate.

In an embodiment of the present invention, in addition to moving the pickup to such a direction that the difference between the tracking error signals corresponding to the two sub-beam spots are made small, the abnormally large difference error signal of the sub-beam spots is prevented from being effected (interrupted) before that the actuator responds to the detection of the scratch, etc. Though the tracking servo system temporarily stops operating, it restarts operating when the sub-beam spot leaves the scratch, etc. in accordance with the movement of the optical card, so that the tracking control is performed continuously and satisfactorily.

Although the foregoing description was made for the optical card, the invention is not restricted thereto, but can be applied to circuits which perform tracking control to other optical recording media.

What is claimed is:

1. In a tracking control circuit for providing a tracking control signal for controlling the tracking for an optical pickup with respect to tracks of an optical information recording medium, wherein two tracking error signals corresponding to two respective sub-beam spots are provided, the tracking control being dependent on the difference of the two tracking error signals, the improvement comprising:
    a difference circuit for providing a difference signal corresponding to a difference of the two tracking error signals, said difference circuit having a signal path for conducting the difference signal;
    a tracking phase compensation circuit comprising a switch (SW2) connected in the signal path of said difference circuit to interrupt the difference signal from the difference circuit in response to an interruption control signal provided thereto;
    a defect responding circuit comprising an addition means connected for adding together the two tracking error signals to form an addition signal corresponding to the sum of the two tracking error signals, and means for generating the interruption control signal dependent on the addition signal, said defect responding circuit having a signal path for conducting the addition signal and the interruption control signal; and
    means connected in the signal path of one of said difference circuit and said defect responding circuit for establishing a relation between the phases of the difference signal and the interruption control signal so that the interruption control signal reaches the switch (SW2) earlier than the difference signal.

2. A tracking control circuit as claimed in claim 1, wherein said optical information recording medium is an optical card.

3. A tracking control circuit as claimed in claim 1, further comprising:
    a write pulse signal device operable to provide a write pulse signal; and
    a write delaying circuit for providing a write delaying signal corresponding to the write pulse signal;
    wherein said difference signal circuit further comprises a second switch (SW1) connected to interrupt the difference signal in response to the write delaying signal.

4. A tracking control circuit as claimed in claim 3, wherein said defect responding circuit further comprises a third switch (SW3) connected to interrupt the addition signal in response to the write delaying signal.

5. A tracking control-circuit for providing a tracking control signal for controlling the tracking of an optical pickup with respect to the tracks of an optical information recording medium, the tracking control circuit comprising:

means for providing two tracking error signals corresponding to two respective sub-beam spots;

a difference circuit for providing a difference signal corresponding to a difference of the two tracking error signals, said difference circuit having a signal path for conducting the difference signal;

a switch (SW2) connected in the signal path of said difference circuit and having a first switch state for outputting the difference signal and a second switch state for interrupting the difference signal in response to a first interruption control signal provided thereto;

an addition circuit connected for adding together the two tracking error signals to form an addition signal corresponding to the sum of the two tracking error signals, said addition circuit having a signal path for conducting the addition signals;

means for generating the first interruption control signal dependent on a value of the addition signal, said means for generating the first interruption control signal having a signal path for conducting the first interruption control signal; and means connected in the signal path of one of said difference circuit, said addition circuit and said means for generating the first interruption control signal for establishing a relation between the phases of the difference signal and the first interruption control signal so that the first interruption control signal reaches the switch (SW2) earlier than the difference signal.

6. A tracking control circuit as claimed in claim 5, further comprising:

means for providing a write pulse signal; and means for providing a second interruption control signal corresponding to the provision of a write pulse;

wherein said difference signal circuit further comprises means for interrupting the difference signal in response to the second interruption control signal.

7. A tracking control circuit as claimed in claim 1, wherein said means for establishing a relation between the phases comprises a high-pass filter provided in the defect responding circuit for eliminating a DC component from the addition signal, thereby advancing the phase of the interruption control signal.

8. A tracking control circuit as claimed in claim 1, wherein the tracking phase compensation circuit comprises a time constant circuit for holding an output signal of the switch (SW2).

* * * * *